United States Patent [19]

Hasegawa et al.

[11] Patent Number: 4,843,909

[45] Date of Patent: Jul. 4, 1989

[54] AUTOMATIC TRANSMISSION CONTROL METHOD

[75] Inventors: Hiromi Hasegawa, Obu; Toshiaki Ishiguro, Nagoya, both of Japan

[73] Assignee: Aisin Seiki Kabushiki Kaisha, Kariya, Japan

[21] Appl. No.: 101,494

[22] Filed: Sep. 28, 1987

[30] Foreign Application Priority Data

Sep. 30, 1986 [JP] Japan .................................. 61-231551

[51] Int. Cl.[4] ............................................. B60K 41/10
[52] U.S. Cl. ...................................... 74/752 C; 74/862
[58] Field of Search ............ 74/866, 862, 878, 752 C; 364/424.1

[56] References Cited

U.S. PATENT DOCUMENTS

| | | | |
|---|---|---|---|
| 3,252,352 | 5/1966 | General et al. | 74/645 |
| 3,338,358 | 8/1987 | Christenson et al. | 192/3.3 |
| 3,610,071 | 10/1971 | Tuck | 74/759 |
| 4,263,822 | 4/1981 | Harmon | 74/862 X |
| 4,346,626 | 8/1982 | Kawamato | 74/866 |
| 4,351,206 | 9/1982 | Lemieux et al. | 74/866 |
| 4,616,531 | 10/1986 | Ogasawara et al. | 74/866 |
| 4,677,879 | 7/1987 | Furusawa et al. | 74/866 |
| 4,694,709 | 9/1987 | Kikuchi et al. | 74/866 |
| 4,697,479 | 10/1987 | Hayakawa et al. | 74/866 X |

FOREIGN PATENT DOCUMENTS

| | | | |
|---|---|---|---|
| 17052 | 1/1984 | Japan | 74/866 |
| 1027 | 1/1985 | Japan. | |
| 1440 | 1/1985 | Japan. | |
| 175212 | 3/1986 | Japan | 74/866 |

*Primary Examiner*—Dwight G. Diehl
*Assistant Examiner*—Harold F. Macris
*Attorney, Agent, or Firm*—Burns, Doane, Swecker & Mathis

[57] ABSTRACT

If a vehicle is at rest after it has been detected that the shift position of the vehicle transmission has been shifted to neutral, hydraulic pressure is introduced to a brake in the transmission gear train that is for establishing the first speed state. The introduction of hydraulic pressure to the brake causes the brake to engage in advance of an actual shift to first speed. As a result, when the shift position is shifted out of the neutral range, the first speed state is quickly established, thereby shortening the neutral-to-drive shift time lag when the vehicle is at rest. If the vehicle is traveling after the shift to neutral has been detected, hydraulic pressure is exhausted from the brake to disengage the same, thereby preventing high-speed rotation of sun gears and clutch disk in the gear train due to transmission of rotation from the output side of the automatic transmission.

4 Claims, 7 Drawing Sheets

AUTOMATIC TRANSMISSION CONTROL METHOD

BACKGROUND

This invention relates to an automatic transmission control method and, more particularly, to a control method whereby the clutch disks and sun gears of a planetary gear train in an automatic transmission for an automotive vehicle are prevented from rotating at high speed when the transmission is shifted into the neutral range while the vehicle is traveling.

FIG. 5 illustrates a gear train of an automatic transmission useful in describing an example of the prior art. In order to shorten a time lag in shifting from the N range to the D range of the gear train when the vehicle having the transmission is at rest, it is arranged so that hydraulic pressure is introduced to a brake B3 even when the transmission is in the N range, as shown in Table 1 hereinbelow. The reason for this is that the stroke (or cylinder) volume of a brake generally is greater than that of a clutch. Even if the transmission is shifted to the N range while the vehicle is traveling, hydraulic pressure is still introduced to the brake B3 in a manner similar to that when the vehicle was at rest.

TABLE 1

|     | C1 | C2 | B1 | B2 | B3 |
| --- | -- | -- | -- | -- | -- |
| REV |    | 0  |    |    | 0  |
| 1st | 0  |    |    |    | 0  |
| 2nd | 0  |    |    | 0  |    |
| 3rd | 0  |    | 0  |    |    |
| 4th | 0  | 0  |    |    |    |
| N   |    |    |    |    | 0  |

When hydraulic pressure is introduced to the brake B3 in shifting to the N range during vehicle travel, as in the prior art set forth above, the sun gear of the gear train rotate at a very high speed.

When the clutch disks and sun gears rotate at such a high speed owing to introduction of hydraulic pressure to the brake B3 in shifting to the N range during vehicle travel, service life is shortened due to rubbing together of the friction members, bearing life is shortened and the gears produce heat and noise.

Accordingly, an object of the present invention is to provide an automatic transmission control method whereby high-speed rotation of the clutch disks and sun gears in the transmission gear train is prevented when a shift is made to the N range during vehicle travel, thus making it possible to extend the lifetime of friction members and bearings and prevent the gears from producing heat and noise.

Other object of the present invention will become apparent in the entire disclosure.

SUMMARY OF THE INVENTION

According to the present invention, the foregoing object is attained by providing a method of controlling an automatic transmission of an automotive vehicle, the transmission having a gear train which includes a brake for establishing a first speed state of the transmission. The method comprises the steps of detecting that a shift position of the automatic transmission has been shifted to a neutral range, thereafter introducing hydraulic pressure to the brake if present vehicle velocity is below a predetermined value, whereby the brake is engaged to establish the first speed state, and exhausting hydraulic pressure from the brake if present vehicle velocity is higher than the predetermined value, whereby the brake is disengaged.

In accordance with the automatic transmission control method of the invention, hydraulic pressure is introduced to a brake of the transmission gear train, which is for establishing the first speed state of the transmission, if the present vehicle velocity is below a predetermined value, namely if it is confirmed that the vehicle is at rest, after it is detected that the shift position has been shifted to the neutral range. The introduction of hydraulic pressure to the brake causes the brake, which has a volume greater than that of a clutch, to engage in advance. As a result, when the shift position is shifted to the neutral range, the first speed state is quickly established in only the time that it takes for the hydraulic pressure to be introduced to the clutch of comparatively small volume, thereby shortening the neutral-to-drive (N-D) shift time lag when the vehicle is at rest.

When the present vehicle velocity is above the predetermined value, namely when it is confirmed that the vehicle is traveling, hydraulic pressure is exhausted from the brake to disengage the same, thereby preventing high-speed rotation of the sun gears and clutch disks in the gear train due to transmission of rotation from the output side of the automatic transmission, namely from the wheels of the vehicle while the vehicle is traveling.

Thus, in accordance with the invention as described above, if it is confirmed that the vehicle is at rest when the shift position is in the neutral range, hydraulic pressure is introduced beforehand to the gear train brake that establishes the first speed state of the transmission, thereby engaging this brake in advance. As a result, the N-D shift time lag can be curtailed. If it is confirmed that the vehicle is traveling at a velocity above a predetermined velocity when the shift is made to the neutral range, hydraulic pressure is discharged from the brake to disengage the same, thereby preventing high-speed rotation of the sun gears and clutch disks in the gear train due to transmission of rotation from the output side of the automatic transmission, namely from the wheels of the vehicle while the vehicle is traveling. This in turn prevents a decline in the durability of the friction members and bearings and reduces the heat and noise generated by the gears while the vehicle is traveling in the N range.

Other features and advantages of the present invention will be apparent from the following description taken in conjunction with the accompanying drawings.

DETAILED DISCUSSION OF THE PRIOR ART

Figure 5:
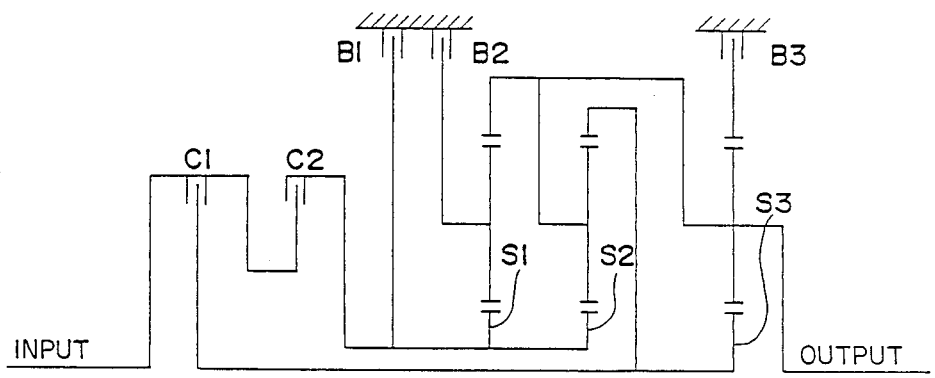
FIG. 5 is a view illustrating a gear train useful in describing the prior art.
Figure 6:
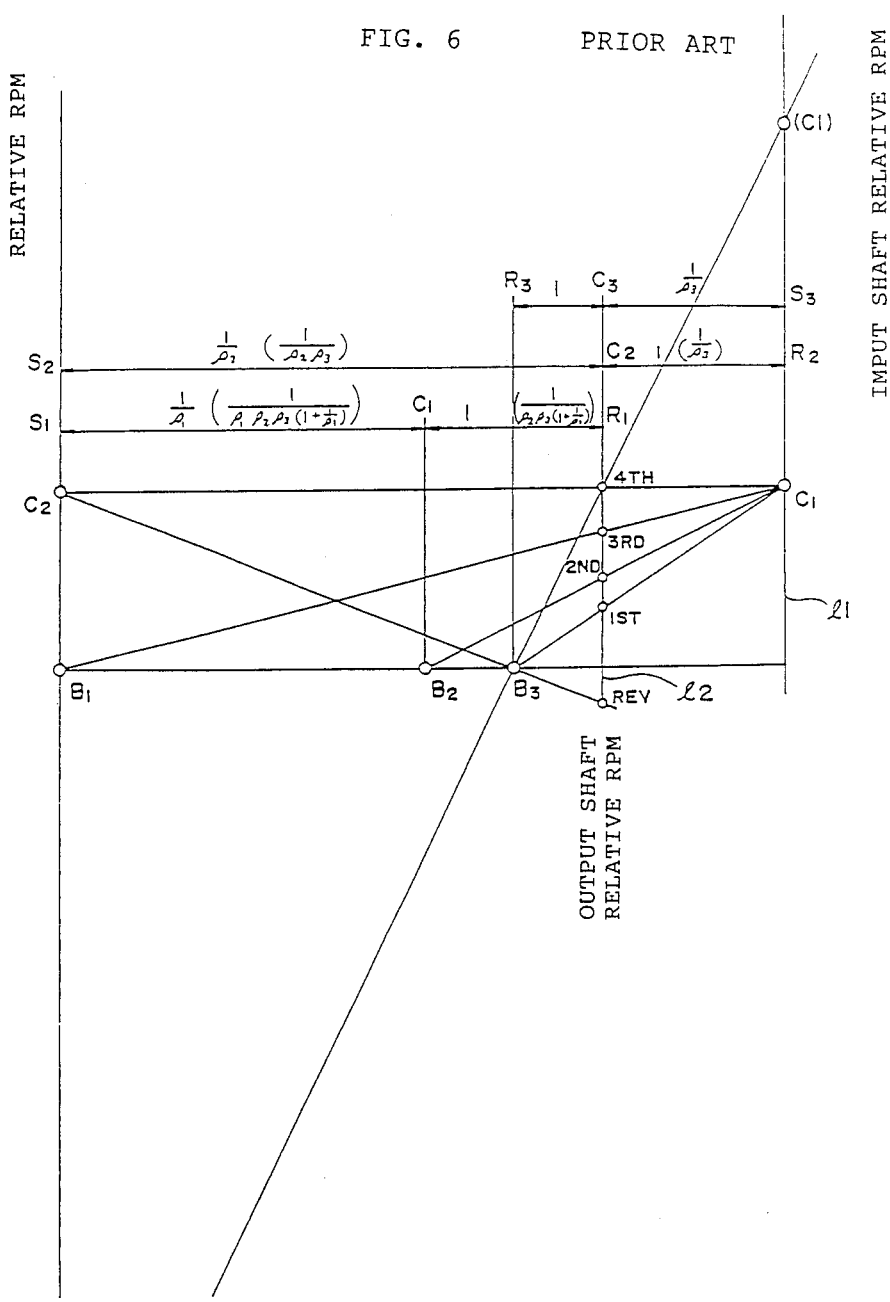
FIG. 6 is a view illustrating the relative rpm ratios of the gear train of FIG. 5.

When hydraulic pressure is introduced to the brake B3 in shifting to the N range during vehicle travel, as in the prior art set forth above in connection with FIG. 5, an axis $l_2$ indicative of relative rpm on the output side becomes the input side and an axis $l_1$ indicative of relative rpm on the input side becomes the output side, as shown in FIG. 6. FIG. 6 is a nomographic chart showing the relative speeds (rpm) of the members of the prior art gear train of FIG. 5. The vertical axis is the speed parameter scale which represents relative rpm, and vertical lines marked $l_1$ and $l_2$ represent input and output shafts, respectively. The reference symbols $B_1$–$B_3$, $C_1$–$C_3$, and $S_1$–$S_3$ represent the members of the gear train as shown in FIG. 5, which figure was discussed earlier herein. The horizontal base line connecting $B_1$–$B_2$–$B_3$ represents the zero speed or braked state (fixed to a stationary member). The vertical lines have the same scale of the relative rotational speed (rpm). The distance between the vertical lines correspond to the gear ratio as explained below. Therefore, as indicated by ($C_1$) on axis $l_1$ in FIG. 6, the relative rpm of clutch C1 on the output side is $$(C1) = \frac{1}{\rho_3}$$

where $\rho_3$ represents the gear ratio of sun gear S3 to the ring gear. Thus, the sun gear of the gear train rotates at a very high speed.

The relative rotational speed ratios of the output shaft in each transmission range of the gear train shown in FIG. 5 are as indicated in the following Table 2, where the gear ratios of the sun gears S1, S2, S3 to the respective ring gears are assumed to be $\rho_1$, $\rho_2$, and $\rho_3$, with fourth speed being unity (1).

TABLE 2

RPM Ratio

REV $\dfrac{1}{\dfrac{1}{\rho_2 \rho_3} - 1} = \dfrac{\rho_2 \rho_3}{1 - \rho_2 \rho_3}$ 1ST $\dfrac{1}{1 + \dfrac{1}{\rho_3}} = \dfrac{\rho_3}{1 + \rho_3}$ 2ND $\dfrac{1}{\dfrac{1}{\rho_2 \rho_3 \left(1 + \dfrac{1}{\rho_1}\right)} + \dfrac{1}{\rho_3}} = \dfrac{1}{1 + \rho_2 \left(1 + \dfrac{1}{\rho_1}\right)}$ 3RD $\dfrac{\dfrac{1}{\rho_2}}{1 + \dfrac{1}{\rho_2}} = \dfrac{1}{1 + \rho_2}$

4TH 1

When the clutch disks and sun gears rotate at such a high speed owing to introduction of hydraulic pressure to the brake B3 in shifting to the N range during vehicle travel, service life is shortened due to rubbing together of the friction members, bearing life is shortened and the gears produce heat and noise. This drawback is eliminated by the present invention.

DETAILED DESCRIPTION OF THE PREFERRED EMBODIMENT

The predetermined value of the vehicle velocity below which the brake is engaged represents a state where the vehicle velocity is nearly zero.

The detection of the neutral range may be effected by means of a computer with a program comprising the steps:

(1) discriminating whether the shift position is at the neutral range, (2) if YES at step (1), discriminating whether the present vehicle velocity is below the predetermined value, (3) if YES at step (2), outputting a signal to disengage said brake, and (4) if NO at step (2), outputting a signal to engage said brake.

The brake for establishing the first speed state acts on a ring gear associated with at least one sun gear in a planetary gear train, a carrier supporting a pinion gear in mesh with said sun gear and ring gear being connected with an output shaft. The planetary gear train includes at least two planetary gear sets, wherein said ring gear belongs to the first planetary gear set of the planetary gear set, said ring gear is coupled with a carrier of the second planetary gear set, and sun gears of said two planetary gear sets are connected to each other. The sun gear is further engageable and disengageable with an input member of the transmission via a clutch.

A preferred embodiment of the invention will now be described in detail with reference to the drawings.

Figure 1:
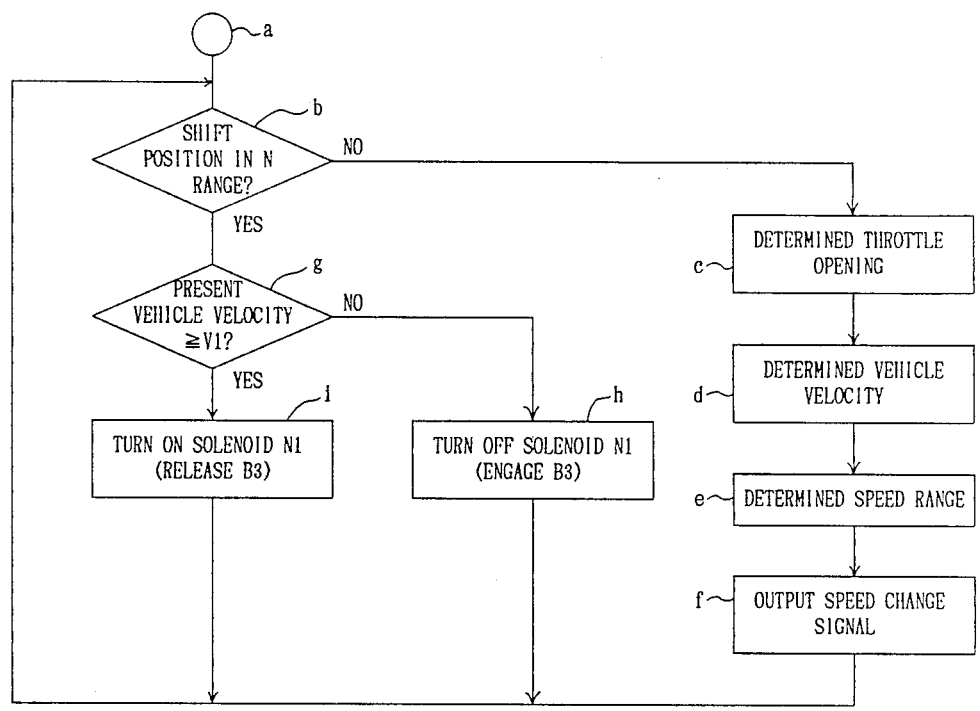
FIG. 1 is a flowchart illustrating the automatic transmission control method of the invention.
Figure 2:
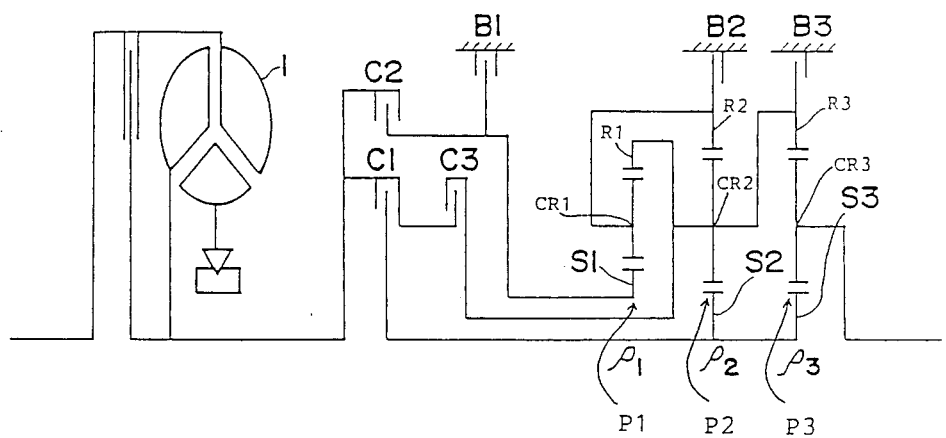
FIG. 2 is a view illustrating an example of a gear train in an automatic transmission controlled in accordance with the method of the invention.
Figure 3A:
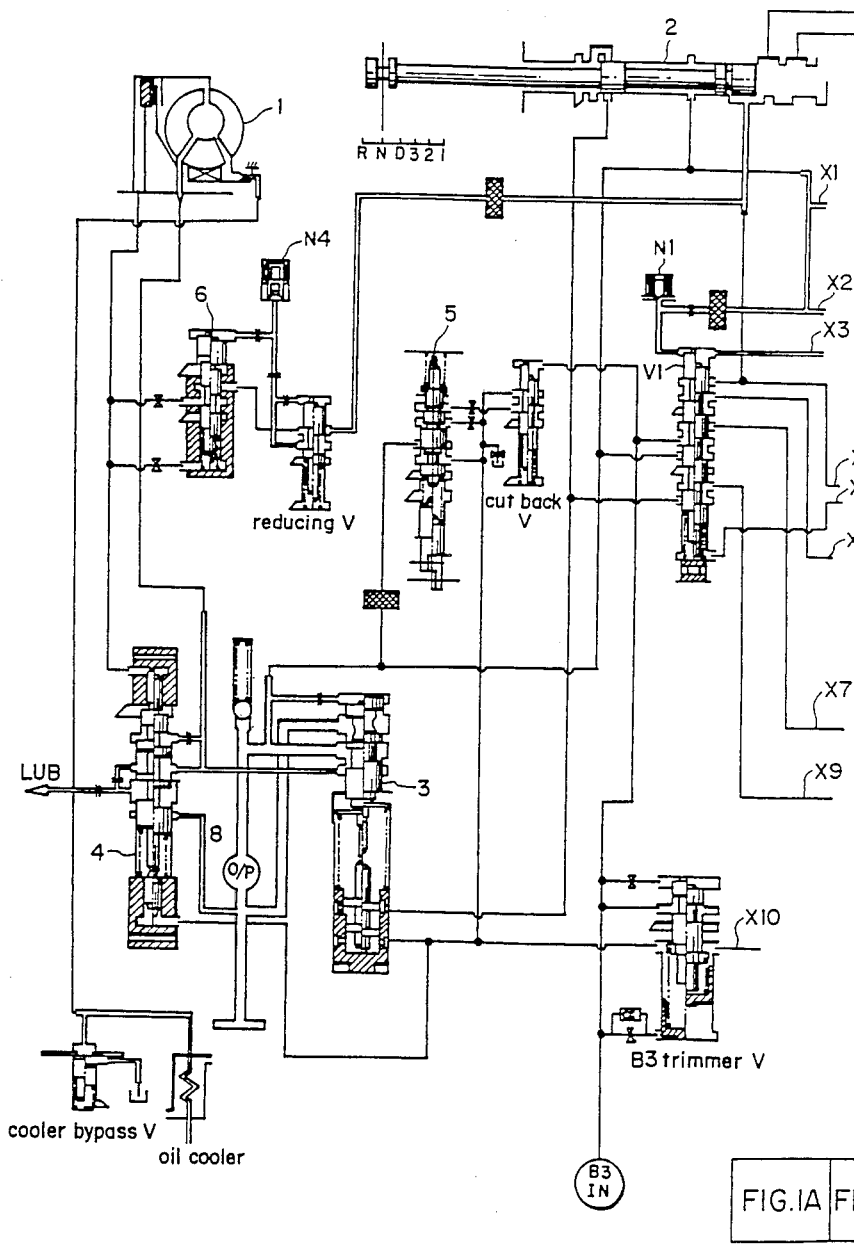
FIGS. 3A and 3B show a hydraulic circuit diagram illustrating the gear grain of FIG. 2.
Figure 3B:
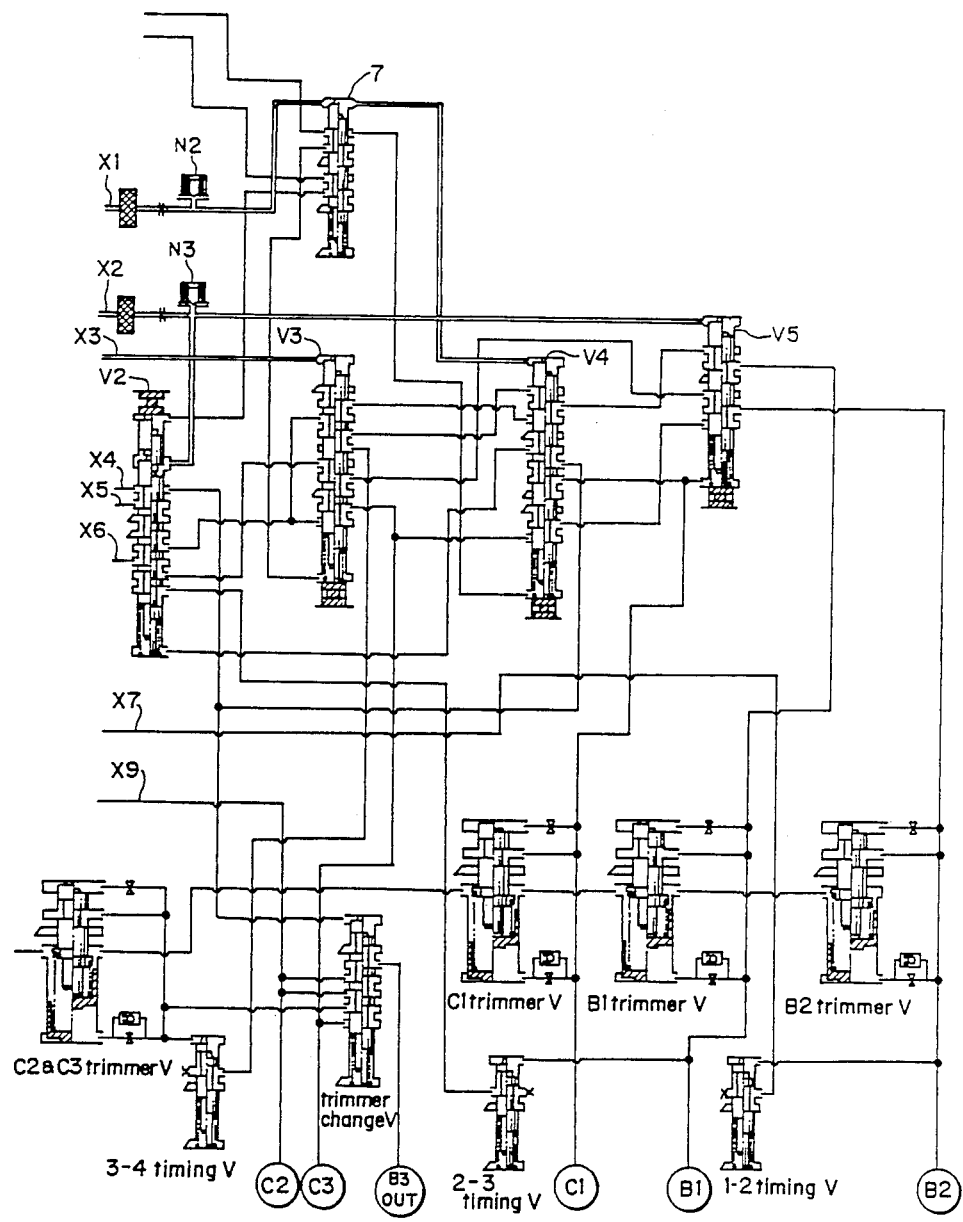

FIG. 1 is a flowchart illustrating a preferred embodiment of the control method of the invention, FIG. 2 illustrates an example of a gear train in an automatic transmission control in accordance with the method of the invention, and FIG. 3 shows a novel hydraulic circuit for the gear train of FIG. 2.

In FIG. 2, the sun gears S1–S3 are in mesh with ring gears R1–R3 via a respective pinion gear (supported by respective carriers CR1–CR3) of each planetary gear set P1–P3. The sun gears S2 and S3 are connected together and further via a clutch C1 engageable/disengageable with an input member of the transmission which is an output shaft of a torque converter 1 with a lock up clutch. A ring gear R3 is connected with a carrier CR2 which acts as an output member of gear set P2 and another ring gear R1 to form a unit which can be braked by a brake B3 and on the upstream side via a clutch C3 engageable with the input side of the clutch C1 (i.e., input member).

A carrier CR3 is connected with an output shaft, while a carrier CR1 is connected to a ring gear R2 to form a unit which may be braked by a brake B2. A brake B1 is applicable to a sun gear S1 which may be engaged/disengaged with the input member via a clutch C2. The clutch C2 is arranged in a parallel power train with the clutches C1 and C3.

The hydraulic circuit of FIG. 3 includes a torque converter 1, a manual valve 2, a primary regulator valve 3, a secondary regulator valve 4, a throttle valve 5, a lock-up control valve 6, an inhibitor valve 7, a 1-2 shift valve V1, a 2-3 shift valve V2, a 3-4 shift valve V3, a 4-5 shift valve V4, a 5-6 shift valve V5, a normally-closed solenoid valve N1, normally-open solenoid valves N2-N3, and a duty valve N4 for lock-up control. Table 3 shown hereinbelow illustrates operation of the solenoid valves N1–N3 and shift valve V1–V5 of the hydraulic circuit of FIG. 3 is each of the transmission speeds, as well as the operation of clutches C1–C3 and brakes B1–B3 of the gear train of FIG. 2 in each of the transmission speeds.

TABLE 3

| | SOLENOID VALVE | | | SHIFT VALVE DIRECTION | | | | | FRICTION MEMBER | | | | | |
|---|---|---|---|---|---|---|---|---|---|---|---|---|---|---|
| | N1 | N2 | N3 | V1 | V2 | V3 | V4 | V5 | C1 | C2 | C3 | B1 | B2 | B3 |
| Rev. | X | X | X | ↓ | ↑ | ↓ | ↑ | ↑ | | | O | | | O |
| N | X | X | X | ↓ | ↑ | ↓ | ↑ | ↑ | | | | | | O |
| 1st | X | X | O | ↓ | ↓ | ↓ | ↑ | ↑ | O | | | | | O |
| 2nd | O | X | O | ↑ | ↓ | ↑ | ↑ | ↑ | O | | | | O | |
| 3rd | O | X | X | ↑ | ↑ | ↑ | ↑ | ↑ | O | | O | | | |
| 4th | X | X | X | ↑ | ↑ | ↓ | ↑ | ↑ | O | O | | | | |
| 5th | X | O | X | ↑ | ↑ | ↑ | ↓ | ↑ | | O | | O | | |
| 6th | X | O | O | ↑ | ↑ | ↓ | ↓ | ↓ | | O | | | O | |

Control of the foregoing automatic transmission is carried out be a computer based on the flowchart shown in FIG. 1. As shown in FIG. 1, the computer is started at step a and then determines at step b whether the shift position is in the N range. If the answer is NO, then the computer successively discriminates the throttle opening (step c), vehicle velocity (step d) and transmission speed range (step d), and then outputs a speed change signal (step f).

If the shift position is found to be in the N range at step b, then the present vehicle velocity V is detected and the computer determines at step g whether the present vehicle velocity is greater than a present vehicle velocity $V_1$. If the present vehicle velocity V is less than the present velocity $V_1$, i.e., if the answer at step (g) is NO, then the solenoid valve N1 is turned off to engage brake B3 at step h. If the present vehicle velocity V is greater than the present velocity $V_1$, i.e., if the answer at step (g) is YES, then the solenoid valve N1 is turned on to disengage brake B3 at step i.

More specifically, if the present vehicle velocity V is less than the set vehicle velocity $V_1$, meaning that the vehicle is at rest, when the shift position is in the N range, then the solenoid valve N1 is closed by being turned off, allowing hydraulic pressure to be introduced to the brake B3, whereby the brake B3 is engaged. By thus introducing hydraulic pressure to the brake B3 it is engaged. By thus introducing hydraulic pressure to the brake B3 in advance, the stroke (or cylinder) volume whereof is larger than that of the clutch, the clutch C1 and brake B3 will each be rapidly engaged to establish the first speed, as will be understood from Table 3, when the transmission is shifted from the N range to the D range. This shortens the time lag when shifting from the N to the D range.

If the vehicle is found at step g to be traveling at a velocity higher than the set velocity $V_1$ when the shift position is in the N range, then the solenoid valve N1 is opened in advance by being turned on, allowing hydraulic pressure to be exhausted from the brake B3 to release the same. This prevents high-speed rotation of the sun gears of the gear train formerly caused by an input from the output shaft on the output side (i.e., by the inertia possessed by the wheels of the vehicle). In other words, as shown in FIG. 4, which is based on the same principles as those discussed earlier in connection with FIG. 6, if the transmission is shifted to the N range and the brake B3 is engaged while the vehicle is traveling, then the axis 1′/2 on the output side becomes the input side and, as indicated by (C1) on axis 1′/1 on the input side, the relative rpm of clutch C1 is $$(C1) = \frac{1}{\rho_3}$$

where $\rho_3$ represents the gear ratio of sun gear S3 to the ring gear. A very high rotational speed is the result. This is as described earlier. However, if the brake B3 is released in advance, as set forth above, the rotation from the output side is not transmitted to the input side and, hence, the sun gears are no longer rotated at high speed.

Figure 4:
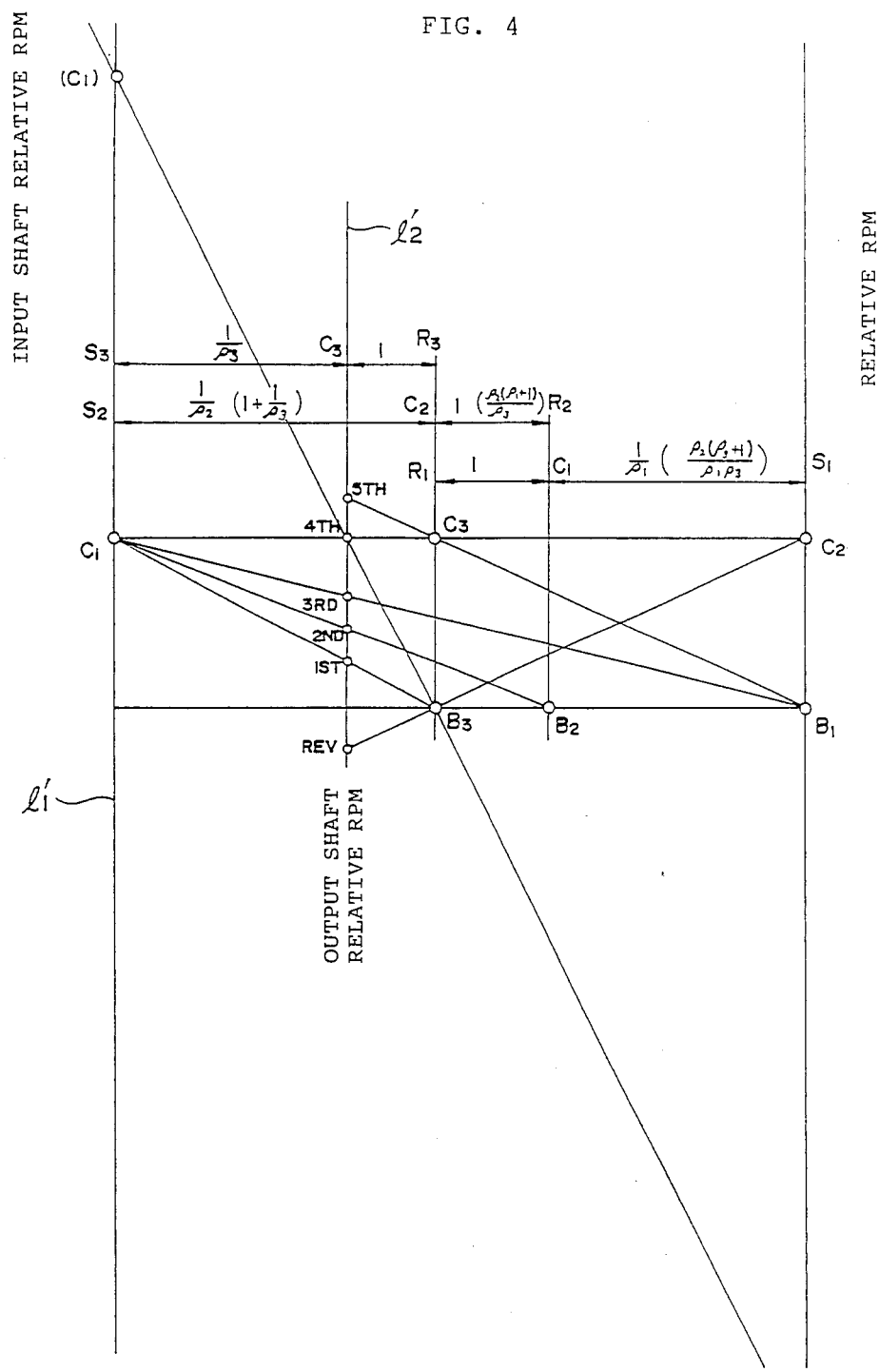
FIG. 4 is a view illustrating the relative rpm ratios of the gear train of FIG. 2.

The relative rotational speed ratios of the output shaft in each transmission range of the gear train shown in FIG. 4 are as indicated in the following Table 4, where the gear ratios of the sun gears S1, S2, S3 to the respective ring gears are assumed to be $\rho_1$, $\rho_2$ and $\rho_3$, with fourth speed being unity.

TABLE 4

RPM Ratio

REV $\dfrac{1}{\dfrac{\rho_2(\rho_3+1)}{\rho_3}+\dfrac{\rho_1\rho_2(\rho_3+1)}{\rho_3}} =$ $\dfrac{\rho_3}{\rho_2(1+\rho_1)(1+\rho_3)} =$ 1ST $\dfrac{1}{1+\dfrac{1}{\rho_3}} = \dfrac{\rho_3}{1+\rho_3}$ 2ND $\dfrac{1+\dfrac{\rho_2(\rho_3+1)}{\rho_3}}{\left(1+\dfrac{1}{\rho_3}\right)+\dfrac{\rho_2(\rho_3+1)}{\rho_3}} = \dfrac{\rho_2(\rho_3+1)+\rho_3}{(1+\rho_2)(1+\rho_3)}$ 3RD $\dfrac{1+\dfrac{\rho_2(\rho_3+1)}{\rho_3}+\dfrac{\rho_2(\rho_3+1)}{\rho_1\rho_3}}{1+\dfrac{1}{\rho_3}+\dfrac{\rho_2(\rho_3+1)}{\rho_3}+\dfrac{\rho_2(\rho_3+1)}{\rho_1\rho_3}} =$ $\dfrac{\rho_1\rho_3+\rho_2(\rho_3+1)+\rho_1\rho_2(\rho_3+1)}{(\rho_3+1)(\rho_1+\rho_1\rho_2+\rho_2)}$

4TH 1.0

5TH $\dfrac{1+\dfrac{\rho_2(\rho_3+1)}{\rho_3}+\dfrac{\rho_2(\rho_3+1)}{\rho_1\rho_3}}{\dfrac{\rho_2(\rho_3+1)}{\rho_3}+\dfrac{\rho_2(\rho_3+1)}{\rho_1\rho_3}} =$ $\dfrac{\rho_1\rho_3+\rho_2(\rho_3+1)+\rho_1\rho_2(\rho_3+1)}{\rho_2(\rho_1+1)(\rho_3+1)}$

What is claimed is:

1. A method of controlling an automatic transmission of an automotive vehicle, the transmission having a gear train which includes a brake for establishing a first lowest speed of said transmission, said brake acting directly on a ring gear which meshes with a pinion, said pinion meshing with a sun gear in a planetary gear train, said ring gear connected with an output member, said sun gear being engageable and disengageable with an input member of the transmission by means of a clutch, said method comprising the steps of:

detecting that a shift position of the automatic transmission has been shifted to a neutral range;

thereafter introducing hydraulic pressure to said brake if present vehicle velocity is below a predetermined value, whereby said brake is engaged to establish the first lowest speed; and exhausting hydraulic pressure from said brake if present vehicle velocity is higher than a predetermined value, whereby said brake is disengaged.

2. A method as defined in claim 1, wherein said predetermined value represents a state where the vehicle velocity is nearly zero.

3. A method as defined in claim 1, wherein said detecting of the neutral range is effected by means of a computer with a program comprising the steps:

(1) discriminating whether the shift position is at the neutral range, (2) if YES at step (1), discriminating whether the present vehicle velocity is below the predetermined value, (3) if YES at step (2), outputting a signal to disengage said brake, and (4) if NO at step (2), outputting a signal to said brake.

4. A method as defined in claim 1, wherein said planetary gear train includes at least two planetary gear sets, said ring gear belonging to the first planetary gear set of the planetary gear trains, said ring gear being coupled with a carrier of the second planetary gear set, and sun gears of said two planetary gear sets being connected to each other.

* * * * *